United States Patent [19]

Miko et al.

[11] 4,277,261
[45] Jul. 7, 1981

[54] REUSABLE HELICAL FILTER FOR HIGH TEMPERATURE GASES

[75] Inventors: Richard J. Miko, Paramus, N.J.; Daniel H. Shapiro, Roslyn Heights, N.Y.

[73] Assignee: Edo Corporation, College Point, N.Y.

[21] Appl. No.: 20,483

[22] Filed: Mar. 14, 1979

[51] Int. Cl.³ .................... B01D 46/24; B01D 46/40
[52] U.S. Cl. ........................ 55/278; 55/492; 55/498; 55/499; 55/520; 55/522; 89/1B; 102/531
[58] Field of Search .......... 55/267, 278, 492, 497–499, 55/520, 522, 525, 529, 38.5 R, 490; 89/1 B; 102/39; 210/497.1

[56] References Cited

U.S. PATENT DOCUMENTS

| | | | |
|---|---|---|---|
| 2,018,074 | 10/1935 | Layte | 55/278 |
| 2,042,537 | 6/1936 | Liddell | 210/497.1 |
| 2,188,643 | 1/1940 | Laderer | 55/492 X |
| 2,383,672 | 8/1945 | Neisingh | 210/497.1 X |
| 2,826,309 | 3/1958 | Forman et al. | 210/488 |

FOREIGN PATENT DOCUMENTS 2350488  4/1975  Fed. Rep. of Germany ............. 55/498

OTHER PUBLICATIONS

Jones, J. I. *Part 2-High Temperature Resistant Fibres from Organic, Polymeric Precursors*, In Filtration & Separation, 7(3): p. 303, May/Jun. 1970.

*Primary Examiner*—Kathleen J. Prunner
*Attorney, Agent, or Firm*—Davis, Hoxie, Faithfull & Hapgood

[57] ABSTRACT

A reusable filter to remove contaminants from high temperature gases, in excess of 4500° F., developed by burning propellants and used to do work such as actuation of piston-powered devices in aircraft store ejector racks. Contaminants are removed to prevent fouling of the device being acted upon. The filter has a metal strip wound in the form of a helix, the turns of the helix being spaced from one another to permit side entry of the gas between the turns. Protuberances spaced along one side of the strip establish filter gaps between the turns. A closed, convoluted structural support runs through the center of the helix from one end to the other of the filter in order to support the shape of the helix. The convoluted structural support also defines a plurality of axial flow passages between its closed surface and the helix, the passages communicating with the filter gaps to allow axial gas flow along the inside of the filter for end exit. The metal strip and structural support are both made of molybdenum, columbium or tantalum. Studs pass through the interior of the convoluted structural support to hold the filter together. Filtering gaps in an axial direction between adjacent turns of the helix may be of the order of a few microns to a few hundred microns.

8 Claims, 5 Drawing Figures

REUSABLE HELICAL FILTER FOR HIGH TEMPERATURE GASES

BACKGROUND OF THE INVENTION

The invention relates to a filter that may be reused many times without damage to remove dirt and other contaminants from high temperature gases generated by burning propellants, and thus prevent the contaminants from fouling movable members exposed to the gas.

Present day military aircraft of high performance capability require external stores to be displaced from the aircraft at high velocity in order for the stores to properly leave the aircraft flow field without damage. This is generally accomplished by ejector racks, missile launchers and the like, using explosive cartridges that create high temperature gases as an energy source. The high temperature gases act on piston actuated devices that in turn eject the stores at the desired high velocity. The propellants burnt in conventional cartridges generate gases of a temperature in excess of 4500° F. Unburnt propellant, residue from igniters, oxides from the cartridge cases, and erosion of the breech all create particles which act to ultimately foul the ejector rack piping and the ejector guns or the like.

In the past, the residue of these particles has been removed by periodic disassembly and cleaning of the rack and the like, which is costly and affects operational availability of the rack. On the other hand, the failure to carry out periodic cleaning affects reliability, since the residue build-up can cause the rack to fail to operate properly. Various solutions to this problem have been sought, including attempts to arrive at a clean burning cartridge that does not provide contaminants, and attempts to design a filter to remove the contaminants from the high temperature gas path before the gas acts on the piston actuated devices. A sufficiently clean burning cartridge is yet to be developed, and filters that may be reused through a large number of operational cycles have not been satisfactorily obtained because of the destructive effects of the high gas temperature on the filter.

SUMMARY OF THE INVENTION

The present invention consists of a reusable filter for high temperature gases which will collect the residue from the gas and thereby provide cleaner gas to a piston actuated device such as found in an ejector rack, missile launcher or the like. The device operation will then be more reliable, and will result in a need for less maintenance than present systems. The filter is constructed with particular materials and a particular design configuration so as to withstand, without ablation or erosion, gas temperatures of over 4500° F. A hot gas filter thereby may be obtained which will be reusable in bomb racks, guns and the like through many firings, without jamming or fouling of the piston actuated devices and without the need for maintenance. The present invention utilizes filter components made from either molybdenum, columbium or tantalum, which have sufficiently high melting points in relation to the hot gas generated. The filter also is designed with sufficiently large helical strip and strip supporting components to provide adequate heat sinks to prevent melting, the helical strip having its adjacent turns mechanically spaced to provide fine slots between the turns to capture the contaminants. The components, however, must not be so large as to cool the gas too much and dissipate its energy before the gas reaches the point where it is to act as an energy source; the components must also be sufficiently small to fit within the intended working environment of an aircraft or missile. The design must also be of sufficient size to provide maximum filtering capacity without excessive pressure drop in the gas.

The invention may also have applicability where the hot gases from burning propellants are used to actuate devices or drive mechanisms such as in gyroscopes in a missile, or to provide thrust in a missile to change its path, it being desired in the former instance that contaminants in the gas not foul the gyroscope and in the latter instance that contaminants in the gas not foul control valves through which the gas passes.

DESCRIPTION OF EMBODIMENT

Figure 1:
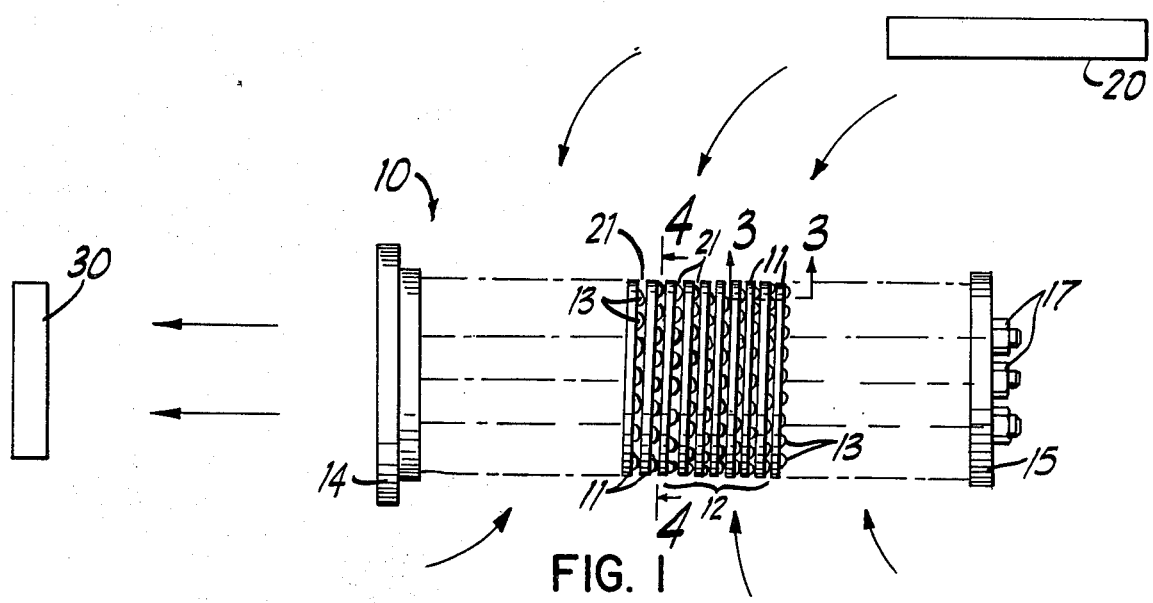
FIG. 1 is a side elevational view of the filter of the present invention, also illustrating the gas flow from a burning cartridge into and out of the filter to a movable member exposed to the gas.
Figure 2:
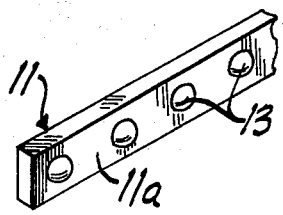
FIG. 2 is a view of a portion of the strip forming the filter of the present invention.
Figure 3:
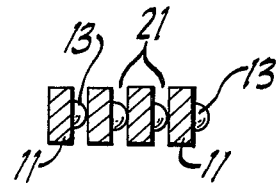
FIG. 3 is an isolated partial cross-sectional view of the filter taken along lines 3—3 of FIG. 1.

Referring now to the drawings, hot gas filter 10 of the present invention has a generally cylindrical outer shape. Filter 10 is formed by a metal strip 11 wound, as on a mandrel, to form a helix 12 as shown in FIG. 1. Strip 11 has generally round protuberances 13 spaced along one side 11a of strip 11, as shown in FIG. 2, the spaced protuberances 13 serving to space adjacent turns of the helix from each other and to form axial gaps 21 therebetween. Helix 12 is formed of a large number of turns, in the order of over a hundred for example.

Helix 12 is positioned and secured between end flange 14 and closed cap 15 of filter 10, as by four studs 16 which pass inside of helix 12 and which are secured to end flange 14 and closed cap 15 of filter 10 as by nuts 17. The filter structure is tightly locked up along its axis, and protuberances 13 are spaced close enough to each other along the strip 11 so as to provide rigidity to the filter and accurately establish the axial spacing between adjacent turns of the helix 12.

Figure 4:
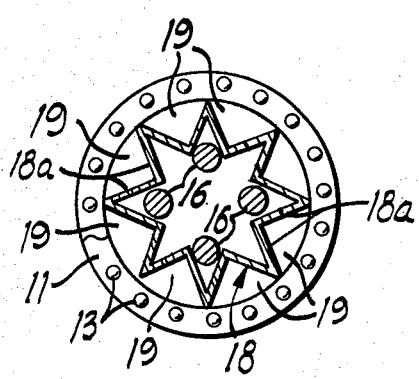
FIG. 4 is a cross-sectional view of the filter taken along lines 4—4 of FIG. 1.

Interior of helix 12 is positioned a convoluted structural support 18 which has a closed imperforate periphery and extends between end flange 14 and closed cap 15. Support 18 is of a shape and strength to maintain the essentially circular cross-sectional integrity of the helix 12, and is shown in FIG. 4 as star-shaped. The convoluted cross-sectional shape of support 18, shown in FIG. 4, contacts helix 12 of strip 11 at spaced portions and further serves to define eight axial flow passages 19 extending from the cap to the flange end of the filter, each passage being defined by walls 18a of the support 18 and portions of the adjacent helix 12. Studs 16 pass through the filter inside of support 18.

As diagrammatically illustrated in FIG. 1, the hot gas from burning cartridge 20 flows to movable member 30 by passing through filter 10. The gas enters the side of filter 10 through gas flow gaps 21 defined by the axial spacing between adjacent turns of helix 12 established by protuberances 13 on strip 11. The high temperature gas passes radially inwardly of the filter through the gaps 21 along the filter, and into the plurality of axial flow passages 19 in communication with the gaps 21, to in turn move axially along the passages 19 toward the filter exit end at flange 14, cap 15 generally being a closed surface.

Figure 5:
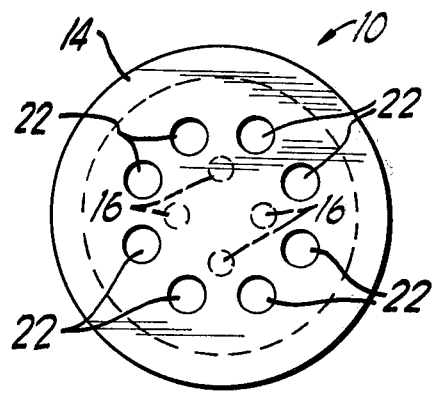
FIG. 5 is an end elevational view at the exit end of the filter of FIG. 1.

Referring to FIG. 5, flange 14 has a plurality of discharge ports 22, from which the hot filtered gas exits to thereafter actuate movable member 30, such as a piston powered device, or drive some other mechanical device such as in a gyroscope or to pass through a control valve. Discharge ports 22 generally are aligned with or overlap at least in part the axial flow passages 19 through which the high temperature gas is flowing. Discharge ports 22 should not significantly impede the gas flow.

By virtue of passing through the filter, contaminant particles are eliminated from the high temperature gas by being captured at the gas flow gaps 21 by virtue of the narrow axial distance between adjacent turns of helix 12. This axial distance, defined by the thickness of protuberances 13, may vary from a few microns to a few hundred microns by way of example, depending on the filtering action desired.

The studs 16, flange 14, cap 15 and nuts 17 may be constructed of corrosion resistant steel, since they are not excessively exposed to hot gas flow. Strip 11 and support 18, however, must be constructed of a material with a sufficiently high melting point so that the hot gas of a temperature in excess of 4500° F. will not cause melting as it passes over these components. Molybdenum, columbium, or tantalum may be used for the strip 11 and support 18 in a filter according to the design of the present invention.

The size of the strip 11 and support 18 of the filter must be such as to absorb sufficient heat to prevent melting, but not excessive so as to overly cool the gas before it reaches the point beyond the filter where the gas is to serve as an energy source and do work. The filter should have sufficient filtering capacity so that the gas is not subjected to a large pressure drop in passing through the filter. The aircraft or missile environment in which the filter has application also dictates a small size and weight of filter. The strip 11 will generally be several times thicker along the filter axis than the thickness of the protuberances 13, and coarser or finer filter gaps may be established by varying the thickness of protuberances 13. A large number of turns of sufficient diameter will be used in helix 12 to obtain sufficient filtering action. Axial flow passages 19 will be sufficient in number and size to avoid obstructing the flow of gas inside the filter toward the discharge ports 22.

It should be understood that modifications of the present invention may be made without departing from the spirit and scope of the invention as hereinafter claimed.

What is claimed is:

1. A hot gas filter to remove contaminants from a gas stream generated by a burning propellant and having a gas temperature in excess of 4500° F., the filter to be capable of surviving numerous exposures to the hot gas without damage and to be used in a system between the burning propellant and a movable member downstream of the filter to reliably prevent fouling of the downstream member after numerous exposures to the hot gas, said filter comprising: a metal strip wound into a helix with a plurality of turns; a cap at one end of the helix; a flange with a plurality of openings at the other end of the helix; axially extending stud means attached to the cap and flange to axially position and restrain the helix; one side of the helical metal strip having spaced protuberances to establish a spacing between adjacent turns of the helix to define filter gaps; a support structure having walls internal to the helix in contact with the helix at a plurality of portions to maintain the cross-sectional configuration of the helix, said support structure extending the length of the filter and defining a plurality of axial flow passages between the support structure walls and the helix, said flow passages being in communication with the said filter gaps; each flange opening overlapping at least a portion of at least one of the plurality of axial flow passages; and the strip and support structure being comprised of a metal capable of withstanding the high temperature gas without melting.

2. The invention defined in claim 1, wherein the metal comprising the strip and support structure is molybdenum.

3. The invention defined in claim 1, wherein the metal comprising the strip and support structure is tantalum.

4. The invention defined in claim 1, wherein the metal comprising the strip and support structure is columbium.

5. The invention defined in claim 1, wherein the support structure has a closed convoluted imperforate shape.

6. The invention defined in claim 5, the support structure being star-shaped.

7. The invention defined in claim 5, the stud means extending internal to the support structure.

8. The invention defined in claim 1, having a separate flange opening for each axial flow passage.

* * * * *